(12) United States Patent
Balasubramanian et al.

(10) Patent No.: US 12,501,319 B2
(45) Date of Patent: Dec. 16, 2025

(54) METHOD AND APPARATUS FOR PROCESSING NEW SERVICE

(71) Applicant: Celona, Inc., Cupertino, CA (US)

(72) Inventors: Srinivasan Balasubramanian, San Diego, CA (US); Shashideep Nuggehalli, Cupertino, CA (US)

(73) Assignee: CELONA, INC., Campbell, CA (US)

(*) Notice: Subject to any disclaimer, the term of this patent is extended or adjusted under 35 U.S.C. 154(b) by 589 days.

(21) Appl. No.: 17/947,044

(22) Filed: Sep. 16, 2022

(65) Prior Publication Data
US 2023/0090081 A1 Mar. 23, 2023

Related U.S. Application Data

(60) Provisional application No. 63/245,722, filed on Sep. 17, 2021.

(51) Int. Cl.
*H04W 28/24* (2009.01)
*H04W 24/08* (2009.01)

(52) U.S. Cl.
CPC .......... *H04W 28/24* (2013.01); *H04W 24/08* (2013.01)

(58) Field of Classification Search
CPC ..... H04L 1/0002; H04L 41/083; H04L 43/04; H04L 45/302; H04L 47/32; H04L 47/11; H04L 61/14511; H04W 24/08; H04W 24/10; H04W 28/0236; H04W 28/24; H04W 76/12
See application file for complete search history.

(56) References Cited

U.S. PATENT DOCUMENTS

| | | | |
|---|---|---|---|
| 9,992,288 B2* | 6/2018 | Ludwig | H04L 61/4511 |
| 2002/0080727 A1* | 6/2002 | Kim | H04L 1/0002 370/282 |
| 2011/0185052 A1* | 7/2011 | Nakahira | H04L 41/083 709/223 |
| 2018/0220277 A1* | 8/2018 | Senarath | H04M 15/8027 |
| 2018/0278496 A1* | 9/2018 | Kulshreshtha | H04L 43/04 |
| 2021/0105698 A1* | 4/2021 | Jactat | H04L 45/302 |
| 2021/0274585 A1* | 9/2021 | Yu | H04W 28/0236 |
| 2021/0352619 A1* | 11/2021 | Ryu | H04W 68/02 |

(Continued)

*Primary Examiner* — Michael Thier
*Assistant Examiner* — Prince A Mensah
(74) *Attorney, Agent, or Firm* — Jaquez Land Greenhaus & McFarland, LLP; Bruce W. Greenhaus

(57) ABSTRACT

Various embodiments of a method and apparatus for introducing a new service are disclosed. In some embodiments, a first Metric Setting (i.e., a Packet Delay Budget (PDB)) is set based on a type associated with the new service, and initial values of the first Metric Setting are also chosen based on the type of the new service. Network conditions are allowed to vary, and performance parameters are measured, while keeping the first performance metric at a fixed value. The other Metric Settings are set based on the measured performance parameters. The process of varying the network conditions, measuring the performance parameters and setting the Metric Settings based on the measurements is repeated until a set of parameters is arrived at, which optimizes the network's performance. Then the PDB is varied, and the process is repeated to optimize the PRB (Priority Resource Block) utilization.

3 Claims, 7 Drawing Sheets

(56) References Cited

U.S. PATENT DOCUMENTS

| | | | |
|---|---|---|---|
| 2023/0089933 A1* | 3/2023 | Xu | H04W 24/08 370/252 |
| 2024/0030969 A1* | 1/2024 | Rekaya | H04B 7/0465 |
| 2024/0259861 A1* | 8/2024 | Hong | H04B 7/185 |

* cited by examiner

Mark all that apply

☐ Conversational voice

☐ Conversational video          500

☐ Gaming

☐ Audio / Video streaming

☐ Group communication

☐ Live streaming (uplink / downlink)

☐ IoT

☐ IIoT

☐ Augmented reality

☐ Other

Priority relative to other services?

Transport Protocol(s) used (http, TCP, UDP, QUIC, ...)?

Application bitrate (min / max limits)?

Application packet arrival rate?

Packet Delay Budget (PDB) for the enterprise network?

Application grouping and aggregate limits

FIG. 5

| QoS Parameter | Initial Training Value | Description |
|---|---|---|
| QCI | Determined based on application category | Based on the input provided about the application type |
| GBR/nonGBR | GBR | Start with a GBR setting and the if the application does not support a packet arrival that demands a GBR setting, change the GBR setting to a nonGBR setting |
| PDB | Acceptable network delay | Calibration of the PDB can be performed after identifying the QoS parameters and adjusted subsequently as needed. |
| Priority | 1 | Initially set to the highest priority to avoid other traffic from impeding the traffic pattern determination for the application. |
| ARP | 1 | Initially set to the highest priority ARP so that no application connection or packet are impeded by other traffic. |
| GBR and MBR | Large value | Set to a large value well beyond the expected throughput of the application. |
| AMBR | Provided by enterprise for APN-AMBR and UE-AMBR | The AMBR is adjusted when indicated by the enterprise to subject the APN or UE to specific limits. |

FIG. 6

METHOD AND APPARATUS FOR PROCESSING NEW SERVICE

CROSS-REFERENCE TO RELATED APPLICATIONS—CLAIM OF PRIORITY

The present application claims priority to U.S. Provisional Application No. 63/245,722, filed Sep. 17, 2021, entitled "Method and Apparatus for Processing New Service", which is herein incorporated by reference in its entirety.

BACKGROUND

(1) Technical Field

When a new service is introduced on a campus running a communications network, a change is made in allocating resources to other applications and flows (in some embodiments, or instances, the new service is an application or runs an application).

(2) Background

When a new service is introduced on a campus running a communications network, a change is made in allocating resources to other applications and flows (in some embodiments, or instances, the new service is an application or runs an application).

FIG. 1 illustrates a block diagram of a communications system 100 in which a new service may be introduced. In some embodiments, system 100 includes elements that support 5G communications, such as a 5G ($5^{th}$ Generation) gNB (Node B) 104, an NSSF (Network Slice Selection Function) 108, an AUSF (Authentication Server Function) 110, a UDM (Unified Data Management) 112, an AMF (Access Mobility and Management Function) 114, a SMF (Session Management Function), 116, a PCF (Policy Control Function) 118, an AF (Application Function) 120, a UPF (Application Function) 122, a first UPF Anchor 124, a second UPF Anchor 126, and a DN (Data Network) 128. The system 100 may also include elements of a 4G ($4^{th}$ Generation) wireless communications network, such as an eNB (evolved Node B) 106, a SGW (Serving Gateway) 130, an MME (Mobility Management Entity) 132, an HSS (Home Subscriber Server) 134, a PGW (Packet Data Network Gateway) 136, a PCRF (Policy Control and Charging Rules Function) 138. Still further, the system 100 may have connections to one or more Intranets or to the Internet 140 and to Operators IP Services 142. A UE (User Equipment) 102 can communicate through the network to access resources, such as the operator IP services 142. Some examples of Operators IP Services 142 include: an MBB (Mobile Broadband), IoT (Internet of Things) devices and an IMS (Instant Messaging Service) services.

In some cases, a MOS (Mean Opinion Score) is computed under full end-to-end operation to optimize the usage of resources and obtain a desired network performance. Relevant QoS (Quality of Service) parameters can then be adjusted in response to the obtained a desired network performance. To further tune the QoS parameters, additional MOS may need to be computed. Computing the MOS typically is done by: (1) sending a questionnaire to the users regarding their impression of the quality of the service they received, (2) waiting for the questionnaire to be returned, and then (3) processing the answers to the questionnaire. One issue with computing an MOS is that the MOS is subjective and requires a large number of users to obtain enough information to be statistically significant. If the QoS settings are adjusted, the MOS measurements typically need to be calculated. In many cases, it is impractical to compute the MOSs under a variety of network conditions within a short period of time. The inability to do so impedes the ability to tune the QoS parameters.

Accordingly, it would be advantageous to provide a system that can be more efficiently and more quickly optimized the network QoS parameter settings when a new service is added to the network.

SUMMARY

Various embodiments of a method and apparatus for introducing a new service (i.e., a service that is new to a network) are disclosed. The disclosed method and apparatus reduce a need to rely on an MOS.

In some embodiments, a network is provided with a network device configured to determine a first "Metric Setting" based on the type of service being added. A Metric Setting is typically a QoS parameter of a network control system for controlling network performance. One example of a Metric Setting is the PDB (Packet Delay Budget) for a particular communication flow. After a first value of a Metric Setting is established, other Metric Settings are set based on that value. "Performance Metrics" are measured to determine whether the Metric Setting can be achieved. Corrective action is taken when the first Metric Setting or one of the other Metric Settings are not met. The Performance Metrics are values of relevant QoS parameters measured for particular data flows (i.e., during operation of the network communicating information to provide network services to users) or a set of values that characterize how the network is performing. The performance metrics are determined for data flows of the new service.

In some embodiments, the network system categorizes the new service into one of several types. The PDB is then set to a default value associated with the new service type. In some embodiments, the PDB may already be fully determined by user requirements or other means. Values are chosen for Metric Settings (other than PDB) that allow the new service as many resources as the new service utilizes when running unconstrained.

To collect performance information based on the current Metric Settings, users are then allowed to use the new service. The performance information is collected for a long enough time at the current Metric Settings to determine a range of values within which the new service runs. Then, the Metric Settings are varied, to collect information under a variety of network conditions to improve the system's capacity while holding the PDB fixed. Instead of conducting a MOS, the value (i.e., a test value) of a network Metric Setting at which the new service stops working or the user stops (or is interrupted) using the new service (i.e., out of frustration because of poor performance) is used as an effective MOS value.

The process of varying Metric Settings while holding the PDB fixed is repeated until a set of Metric Settings is arrived at that further improves (i.e., maximizes) the system's capacity at a fixed PDB while meeting a desired QoS. If the optimum PDB is not yet known after the other Metric Settings are determined for a current PDB, the PDB is varied, and then the other Metric Settings are again varied while holding the PDB fixed. In some embodiments, an ARP (Allocation Retention Priority) based on the PDB.

In some embodiments, a SLA (Service Level Agreement) value is determined based on a default PDB. In some embodiments, a QoS identifier is determined based on the PDB. In some embodiments, a dedicated radio bearer is determined for an application of interest or the new service, based on the ARP determined. In some embodiments, a dedicated radio bearer is determined based on the Metric Settings that were updated.

The process of varying the PDB and then varying the other Metric Settings while holding the PDB fixed is also repeated to improve (i.e., optimize) the PRB (Priority Resource Block) utilization. In some embodiments, the PRB utilization is improved (i.e., optimized) by increasing (i.e., maximizing) a BDP (Bandwidth Delay Product).

BRIEF DESCRIPTION OF THE DRAWINGS

The disclosed method and apparatus, in accordance with one or more various embodiments, is described with reference to the following figures. The drawings are provided for purposes of illustration only and merely depict examples of some embodiments of the disclosed method and apparatus. These drawings are provided to facilitate the reader's understanding of the disclosed method and apparatus. They should not be considered to limit the breadth, scope, or applicability of the claimed invention. It should be noted that for clarity and ease of illustration these drawings are not necessarily made to scale.

FIG. 5 illustrates an example of a questionnaire, which in some embodiments, is given to the user for collecting information about the new service.

FIG. 6 indicates how the initial values of the QoS (Quality of Service) parameters are chosen.

The figures are not intended to be exhaustive or to limit the claimed invention to the precise form disclosed. It should be understood that the disclosed method and apparatus can be practiced with modification and alteration, and that the invention should be limited only by the claims and the equivalents thereof.

DETAILED DESCRIPTION

When a new service is to be added to an existing communication network, the amount of resources and the QoS (Quality of Service) to be allocated to the new service and the previously provided services needs to be managed to ensure that the new service can be supported and that the amount of network resources is allocated appropriately between all of the services to be provided by the communication network.

When a new service is to be added, the amount of information that is available regarding the type of service and the needs of that service typically will vary. Having more information available makes it possible to provide a better estimate of the QoS parameters that are required to provide the desired overall QoS for data flows in the new service. For example, intelligent estimates can be made as to what values should be assumed for the QoS parameters in QoS flows in the new service, by knowing whether the new service is a service providing: (1) conversational voice, (2) conversational video, (3) gaming, (4) audio/video streaming, (5) group communication, (6) live streaming (uplink/downlink), (7) IoT (Internet of Things), (8) IIoT (Industrial Internet of Things), (9) Augmented reality, etc.

By starting with default values for the PDB (Packet Delay Budget), first optimizing network Metric Settings of the QoS parameters for a fixed PDB and then varying the PDB to optimize the PRB (Physical Resource Block) utilization, the process of finding the optimum set of Metric Settings (i.e., values of the QoS parameters) is improved and can be performed faster. In some embodiments, after allowing the network system to run unconstrained, values for the other Metric Settings are chosen based on measurements of the metrics of performance. The network system is then optimized by relying on the point of application failure as the effective MOS. Since the network system starts with a default value for the PDB, reliance on conducting a MOS is reduced (i.e., minimized). Although a MOS is still useful in ensuring that the system performs as needed by the user, reliance on MOS input is reduced, improving the efficiency of finding the optimum network Metric Settings. Additionally, using default values for at least some of the Metric Settings, speeds and improves an optimization process that is performed as part of adding a new service.

Figure 2:
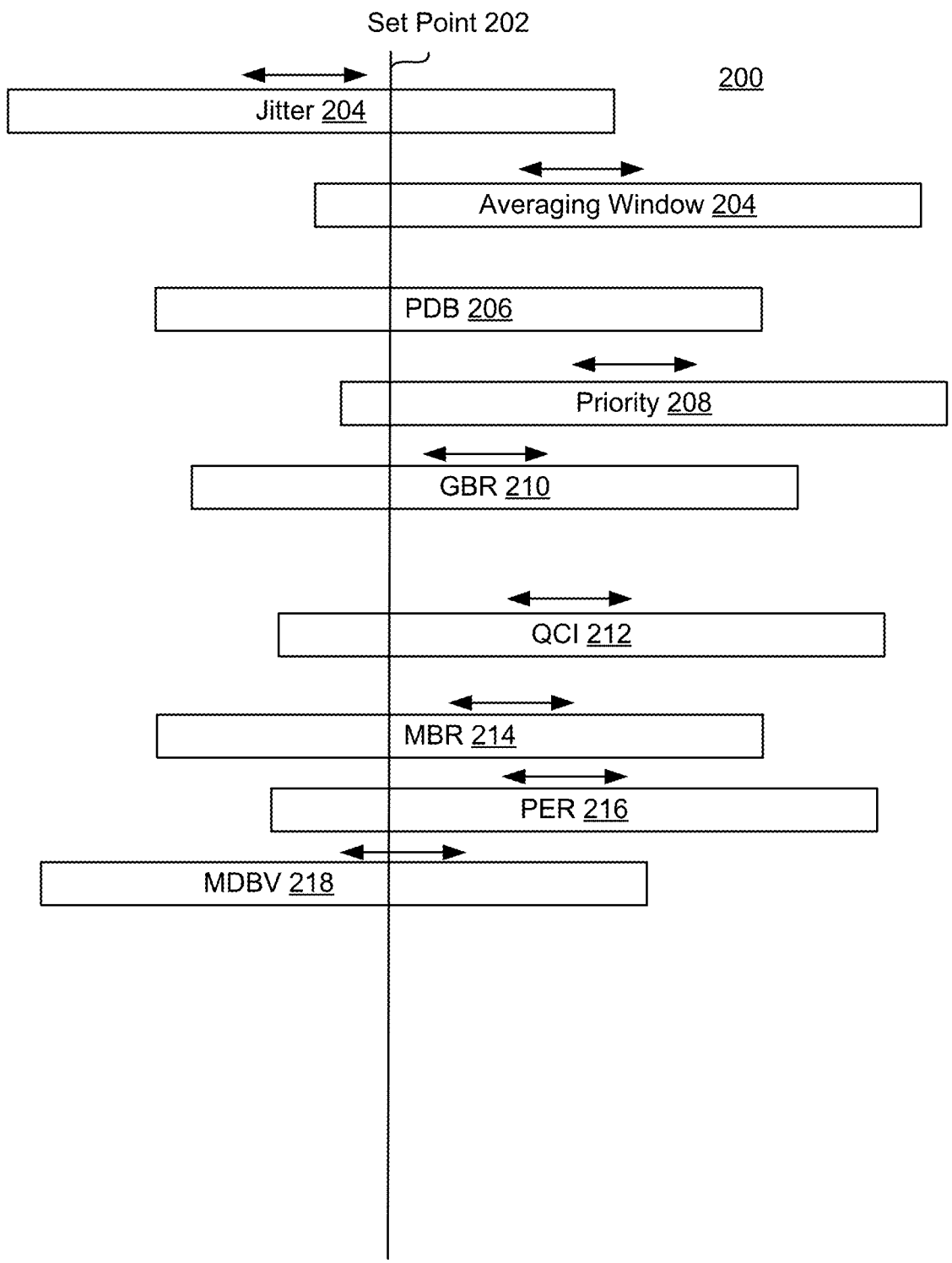
FIG. 2 illustrates a chart of interdependent, adjustable Metric Settings for a new service, which are adjusted to improve (i.e., optimize) the capacity or improve (i.e., minimize) the PRB (Physical Resource Block) utilization of a network.

FIG. 2 illustrates a chart 200 of interdependent, adjustable Metric Settings for a new service, which are adjusted to improve (i.e., optimize) the capacity or improve (i.e., minimize) the PRB utilization of a network. Chart 200 shows set point 202 and adjustable settings. In some embodiments, the adjustable settings include jitter 204, averaging window 206, PDB 208, priority 210, GBR (Guaranteed Bit Rate) 212, QCI (QoS (Quality of Service) Class Identifier) 214, MBR (Maximum Bit Rate) 216, PER (Packet Error Rate) 218 and AMBR (Aggregate Maximum Bit Rate) 220. Set point 202 is a fixed value at which a first Metric Setting is held. In some embodiments, the first Metric Setting is a PDB setting. In other words, in some embodiments, the PDB is held fixed at set point 202, while the other Metric Settings are varied. As indicated by the double-headed arrows and the line representing the PDB set point 202, each of a collection of the Metric Settings is varied except for one (i.e., the PDB 206).

Jitter 204 refers to the variation in the latency, which is also referred to as packet delay variation. Averaging window 206 is the window over which the packet arrival times are averaged.

For a GBR bearer averaging window 206 is determined based on the variability in the packet sizes. Averaging window 206 is set to a duration of time large enough to allow for transmission of all the packet sizes of interest for use by the new service (e.g., 90% of the distribution of the packet sizes). For a non-GBR bearer, averaging window 206 is a function of typical burst duration (a multiple of a measured burst duration). In some embodiments, a $95^{th}$ percentile of the burst duration (which is large enough to include 95% of a collection of burst durations).

PDB 208 defines an upper bound for a duration of time that a packet is allowed to be delayed during a transmission between the UE and the UPF that terminates the N6 interface. A packet that is delayed longer than the PDB is treated as dropped. For Non-GBR and GBR resource types the PDB 208 denotes a "soft upper bound" in the sense that an "expired" packet, e.g., a link layer SDU (Service Data Unit)

that has exceeded the PDB, does not need to be discarded and is not added to the PER. For a Delay critical GBR resource type, packets delayed more than the PDB are added to the PER and can be discarded or delivered depending on local decision.

Priority 210, for 5G communications, is a priority in scheduling resources among different QoS Flows. The priority 210 differentiates between QoS flows of the same UE and differentiates between QoS flows from different UEs. In some embodiments, the lower the value of the priority level, the higher the priority. During congestion, when a desired set of (i.e., all) QoS requirements cannot be fulfilled for one or more QoS flows, which QoS flows have their requirements satisfied and which QoS flows are left unsatisfied. The QoS requirements are prioritized such that a QoS flow with higher priorities are satisfied first.

When the system is not congested, the priority 210 determines the resource distribution between QoS flows. In addition, a scheduler may prioritize QoS flows based on other parameters (e.g., resource type, radio condition) in order to optimize performance of the new service and network capacity. GBR (Guaranteed Bit Rate) 212 is a minimum bit rate that is guaranteed to a GBR bearer or GBR flow. QCI (QoS Class Identifier) 214 is an identifier that is used to identify a set of QoS requirements of a flow. MBR (Maximum Bit Rate) 216 is an upper limit on the bit rate allowed to a flow or device. PER (Packet Error Rate) 218 is the number of incorrectly received data packets divided by the total number of received packets. A packet is declared incorrect if at least one bit is erroneous. AMBR (Aggregate Maximum Bit Rate) 220 is the maximum possible bit rate configured by the operator for a particular flow or user.

In other embodiments, another Metric Setting is held fixed (instead of holding the PDB fixed), while the remaining Metric Settings are varied. Altering any of the Metric Settings affects optimum values of the other Metric Settings that will give an optimum performance of the network, to at least some degree, which complicates finding the optimum combination of values of the Metric Settings. Holding one of the Metric Settings fixed, while the others are varied simplifies finding the values of the optimum set of Metric Settings. Although the value of each Metric Setting affects the optimum value of the other Metric Settings, the degree that each Metric Setting affects the other Metric Settings is different. The Metric Setting that is held fixed is one that has a profound effect, or more of an effect, on the desired values for the other Metric Settings than the other Metric Settings have on a collection of Metric Settings. In some situations, the value of one or more of the other Metric Settings may also be held fixed because of requirements of the new service and/or the user's needs.

Figure 3:
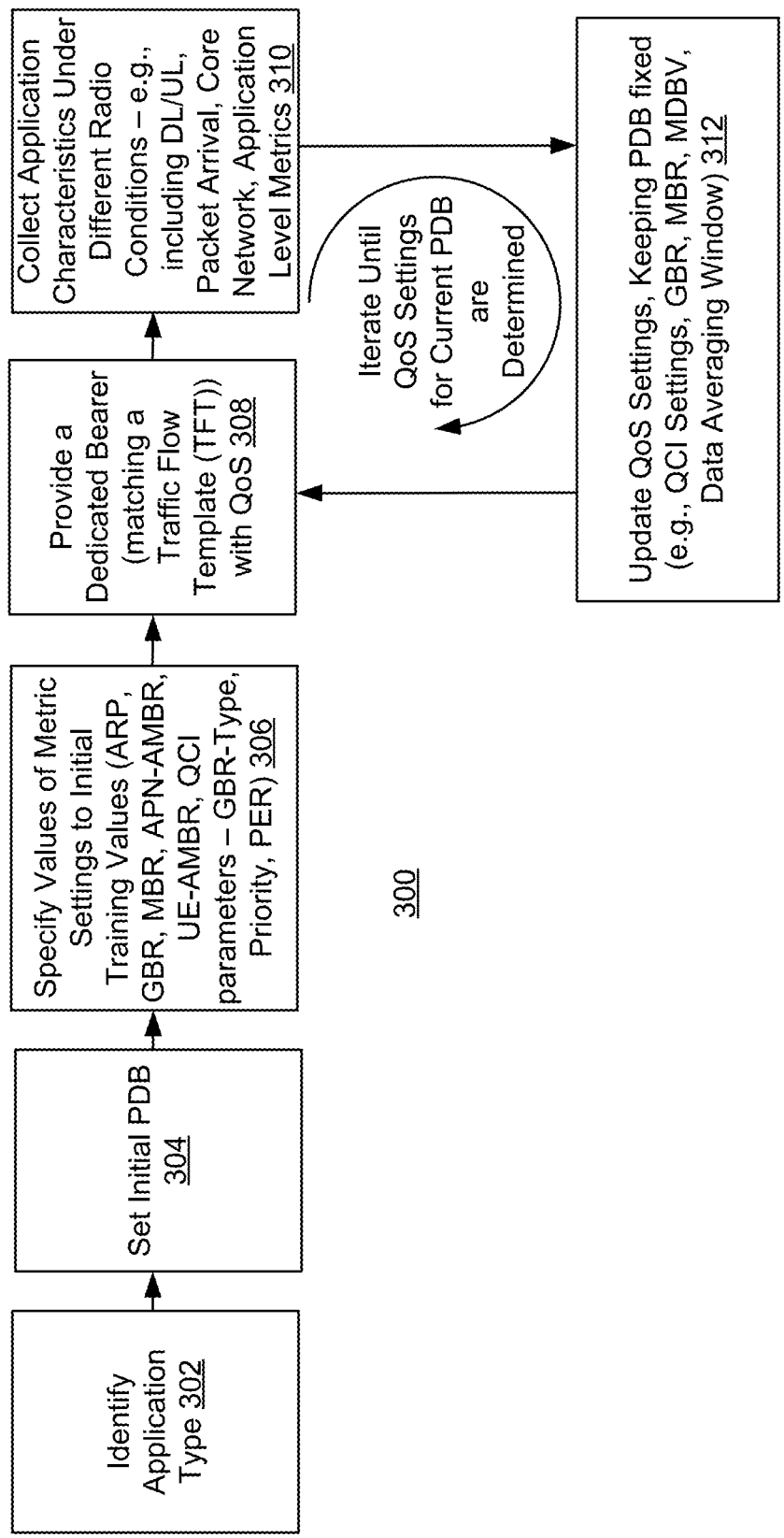
FIG. 3 illustrates a method for finding the network settings that accommodate the new service while optimizing network performance.

FIG. 3 illustrates a method 300 for finding the Metric Settings that accommodate the new service while optimizing network performance. In the step 302, the new service is categorized to determine what type of application the new service implements. In some embodiments, the step 302 includes sending a questionnaire to a user requesting the user to provide as much information as the user is aware of, regarding the requirement of the new service. The more information the user can provide about the requirements of the new service, the better. However, often the user is only able to provide very general information. If the user cannot provide a value for the PDB, an initial value is chosen based on the new service type provided. In some embodiments, the type of new service is detected automatically by reading code or text associated with the new service or running the new service. In some embodiments, when a better value is not available, the PDB is based on a lookup table correlating the type of service provided with PDB values.

During a first iteration, the application is assigned the highest available priority setting. Instead of measuring the MOS, the range of metric parameters are measured as the users use the new service, and as long as the new service does not disconnect and there is no indication that the user disconnected the application in frustration, the value determined is used as an acceptable MOS value. As an example of an indication that the user disconnected the new service in frustration, is an indication that the user disconnected the new service after starting a task, but without waiting for the task to be completed.

In a step 304, based on the type of application determined in the step 302, a value for a first Metric Setting is chosen. In some embodiments, the first Metric Setting is the PDB, which is chosen to meet a desired MOS and SLA (Service Level Agreement). However, conducting a MOS at this initial stage is not necessary. Initially, in some situations, a custom QCI is chosen so that the learning process is not affected by preset standards that may be built into the equipment or protocols in use.

In a step 306, initial values for the remaining Metric Settings are chosen that allow the new service to run unconstrained. In some embodiments, values are chosen for the QCI, the ARP (Allocation and Retention Priority), the BBR (Bottleneck Bandwidth and RTT), the MBR (Maximum Bit Rate) and the AMBR (Aggregate Maximum Bit Rate) for the UE and the AP (Access Point). In some embodiments, the questionnaire also asks for a maximum burst rate, which is useful in tuning ultralow bit rate functions (i.e., functions having a QCI of 82, 83, 84, or 85).

In a step 308, a dedicated bearer is provided for the application to match the TFT (Traffic Flow Template) with the QoS desired. The first time the step 308 is performed, an initial radio bearer is chosen, and during subsequent repetitions of the step 308, if needed, the radio bearer is changed or updated. For example, some criteria used in determining the bearer are as follows. UDP (User Datagram Protocol) communications, TSN (Time Sensitive Networking) based applications, a flow that has uniform packet arrival and flows having packet clusters that are smaller than a Path-MTU (Path Maximum Transmission Unit) are assigned to a GBR bearer. Similarly, a TCP (Transmission Control Protocol) flow, QUIC flow and a flow having bursty packet arrivals are assigned to a non-GBR bearer. It should be noted that QUIC is not an acronym but the name of a protocol. A given UE is not assigned a priority higher than a priority associated with the radio bearer assigned to the UE. In some embodiments, GBR radio bearers are assigned a higher priority than non-GBR radio bearers.

In some embodiments, as mentioned above, initially, the highest priority available is assigned (i.e., a priority of 1) to the new service and performance is measured. Subsequently, unless the measured performance indicates otherwise, a priority is initially assigned based on user input (or a QCI table, if appropriate) regarding the relative priority of the new service as compared to other applications running on the system.

In a step 310, traffic characteristics, which result from the QoS settings chosen, are measured. For example, the packet arrival time can be measured to determine whether to use a GBR or nonGBR bearer. The packet arrival times are measured by determining the packet arrival delays, which indicates the transit time of a packet, for example, which in turn indicates a transit time for a unit of data. A histogram of packet sizes is collected, and packet arrival times are based on the histogram, because the number of units of data in the packet multiplied by the transit time for a data unit, gives the transit time for the packet. The burstiness of the traffic (the size of large gaps and the number of packets clustered together at arrival) is measured.

Message arrivals and message sizes are measured to determine the peak burstiness, and a MDBV (Max Data Burst Volume) is determined based on the measurements. If the bearer is a GBR radio bearer, the variation of the packet sizes is measured. The averaging window is set to the largest time window that allows for all of a desired collection of packet sizes that the applications use for transmission.

The PDB can be measured to determine the ARP. For GBR flows, the throughput and packet scheduling delay are measured to determine to the GBR and MBR. The throughput is measured in different time window sizes. In some embodiments, the window sizes are 20 ms, 50 ms, 100 ms, 200 ms, 300 ms, 500 ms, 1 sec, 2 sec and 5 secs. The measurement of the throughput at different window sizes, helps determine the minimum and maximum throughput for the different time windows.

In some embodiments, if the traffic is GBR traffic, the GBR-bearer setting is adjusted if the network channel is poor or if network congestion is high. In some embodiments, if the bearer is a non-GBR bearer, a delay budget is relaxed during high congestion. If the bearer is a non-GBR bearer, the length of time of data bursts is measured, and the averaging window is set to a value characterizing a length of time of a typical burst (i.e., the average time or meridian time).

After determining the other QoS parameters, the QoS priority is lowered by 1 and the new service is run in a mixed traffic scenario. If the QoS guarantees can be met, the QoS is again lowered, and a determination is made whether the QoS guarantees are met. When a priority value is found at which the QoS guarantees cannot be met, the process ends, and the priority is set to the previous priority (which is one priority level higher than the priority level at which the QoS guarantees could not be met).

Data Rate Averaging Window

For Non-GBR, the delay value is determined. If restrictions on fair-sharing are to be applied and more than a threshold number of users will be supported, the MDBV is set to the value of the GBR, determined by measuring the minimum throughput value using the largest time window that will allow for the PDB criteria to be met.

For Delay-Critical GBR flows the MDBV is measured. The largest time window that will allow for the PDB criteria to be met is determined, and the minimum throughput value is used as the GBR, and the max value are used as the MDBV. For dedicated bearers, if a typical averaging window needs to be applied, the largest of a collection of time windows identified above is used as the 'Data rate averaging window.'

In some embodiments, the step 310 includes measuring the performance metrics during a variety of network conditions, which are occur as a result of the users using the new service. In some embodiments, the variety of the network conditions occurs over time as a result of usages of the new service. In some embodiments, the network conditions are actively varied while taking measurements. The different conditions include different radio conditions and while having access to different compute resources. In some embodiments, QoS metrics are set, and PERs are measured. The PERs are correlated with the QoS metrics set. In some embodiments, the step 310 includes measuring performance metrics while uploading information and downloading information. In some embodiments, in the step 310, packet arrival times, radio conditions, core network parameters, and application level network parameters (when possible) are collected. In some embodiments, the data collected relates to different metrics, including RAN metrics from different layers, including a physical layer, a network layer and a host-to-host layer. In some embodiments, the network parameters and the system capacity are measured.

In some embodiments, the radio conditions are measured at various locations on the campus on which the application is deployed. The different locations include different distances from available access points (i.e., near-cell, mid-cell, and far-cell locations). In some embodiments, network performance parameters are measured while network traffic is congested and while network traffic is light. In some embodiments, network performance parameters are measured while different combinations of other applications are also running. In some embodiments, the application is allowed to run using different network resources. The network performance parameters are measured while the application is running on on-campus equipment, while running in the cloud and while running in a DMZ (Demilitarized Zone). In some embodiments, the network performance parameters include L1, L1.5, L2, and L3 performance parameters. Assuming that the application supports adjusting the rate at which packets are sent, the Metric Settings are adjusted based on the measured performance parameters and the available capacity of the link. The lowest supported bit rate and the highest bit rate under various radio conditions are correlated with the Metric Settings so that a GBR and an MBR can be recommended.

In a step 312, the network parameters are adjusted based on the measured network parameters. During the step 312, unless the other Metric Settings for a current PDB have been determined (have stabilized), the PDB is kept constant. In some embodiments, the step 312 includes updating the GBR, MBR, MDBV and the data rate averaging window. During the step 312, a determination is made whether the application can support data variable transmission rates by adjusting the available channel capacity.

After the step 312, the method 300 returns to the step 308. The steps 308, 310, and 312 are repeated (potentially multiple times) until the set of performance metrics the system capacity for the current PDB. In some embodiments, optimizing includes finding the Metric Settings that keep the performance metrics within an acceptable range (i.e., until the QoS parameters stabilize while keeping the PDB constant). The acceptable range is determined based on statistical variations (e.g., within one standard deviation of a mean value). In some embodiments, the acceptable range is dependent on the degree to which the PDB is known, After the QoS parameters converge, the PDB is varied, and the steps 308, 310, and 312 are again repeated until the set of Metric Settings are found that keep the performance metrics within an acceptable range.

In some embodiments, the Metric Settings are chosen to improve (i.e., minimize) the PRB utilization. If the bearer is a GBR bearer, in some embodiments, the PDB is adjusted (i.e., in increments of 10 ms). The jitter is measured under various conditions, and the jitter tends to increase as the PDB is lowered. The PDB is lowered while reducing (i.e., minimizing) the jitter until the jitter is within a desired range of values, in which the jitter does not exceed a maximum acceptable value.

If the bearer is a non-GBR bearer, the PDB is adjusted to reduce and/or smooth out burstiness. There are two approaches. In a first approach, the PDB is initially set to a percentage (i.e., 50%) of the characteristic burst duration and then adjusted in increments (i.e., 10 ms) until the burstiness is below a desired threshold. Tests are performed to determine the PRB utilization (using different radio channels and under different congestion conditions). In a second approach, the BDP (Bandwidth Delay Product) is measured, and the PDB is adjusted to increase (e.g., maximize) the BDP. The system does not need to be optimized for the Delay-Critical Bearer. Implementing the method of FIG. 3 allows for individual services and mixed traffic types to be introduced and then to check the performance metrics while any combination of other services is running. Employing AI (Artificial Intelligence) while optimizing the system facilitates identifying further optimizations.

Figure 4:
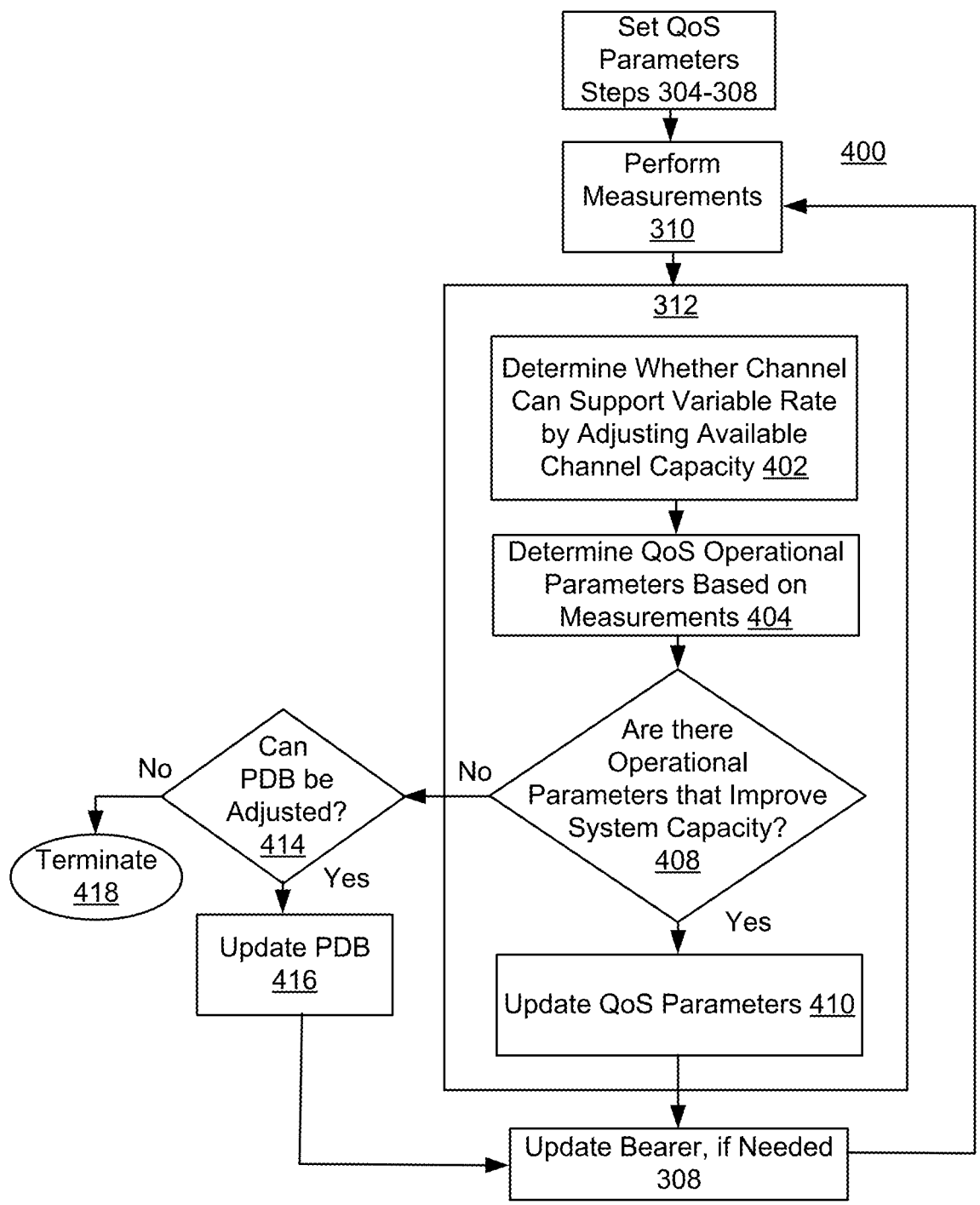
FIG. 4 illustrates further details of some embodiments of the method of FIG. 3.

FIG. 4 illustrates further details of some embodiments of method 300. As discussed in regard to FIG. 3, during the steps 302-308, values for initial Metric Settings are assigned, and during the step 310, network performance metrics are measured.

As part of the step 312, in a step 402, available channel capacity is adjusted, and a determination is made whether a channel can support a variable rate. In a step 404, performance metrics are determined based on measurements. In a step 408, a determination is made whether there are Metric Settings that improve system capacity. If there are Metric Settings that improve system capacity, then, in a step 410, the Metric Settings are updated. If no Metric Settings improve the system capacity, the method proceeds to a step 414. In a step 414, a determination is made whether the PDB can be adjusted. If the user requires a specified PDB or if it has been determined that there is no PDB that will improve the PRB, the PDB cannot be improved. If the PDB can be adjusted, the PDB is adjusted in a step 416. Then, the method returns to step 410, and the bearer is updated, if needed. In some embodiments, after the step 416, the method returns to the step 408, and in some embodiments, the performance metrics are updated based on the newly chosen PDB. If the PDB cannot be adjusted, in a step 418, the method terminates.

FIG. 5 illustrates an example of a questionnaire 500, which in some embodiments, is given to the user for collecting information about the new service. Questionnaire 500 asks whether the service will be used for conversational voice communications, conversational video communications, gaming, audio/video streaming, group communications, live streaming, IoT (Internet of Things), IIoT (Industrial Internet of Things), augmented reality, or other uses. The questionnaire asks the relative priority of the new service, which facilitate determining the QCI and the ARP. The questionnaire asks the transport protocol used, which is informative in determining the packet header overhead and the amount of return link capacity is required. The questionnaire asks for information related to the aggregation limits and the application grouping, which is helpful in the APN-AMBR and the UE-AMBR. Depending on the response, an initial set of default values is chosen for the system's parameters. The questionnaire facilitates determining whether the bearer should be a GBR or a nonGBR bearer (such as by asking the user for the PDB, protocol and the type of the new service).

For example, suppose the user indicates that the new service is conversational voice. In that case, the PDB is initially set to 100 ms. Additionally, it is expected that a resource type to be a GBR bearer. As another example, suppose the user indicates that the new service is conversational video. In that case, default Metric Settings are assigned, which include a resource type of a GBR bearer and a PDB of 150 ms. Likewise, if the user indicates that the new service is gaming, then default Metric Settings are assigned, which include a resource type of a GBR bearer and a PDB of 50 ms. Suppose the user indicates that the new service is audio/video streaming. In that case, default Metric Settings are assigned, which include a resource type of a nonGBR bearer and a PDB of 100 ms. In some embodiments, initial default Metric Settings for the PDB and bearer are based on a QCI table, unless better information is available.

To support independent slices, a model of traffic congestion in a network is created, using the processors of the nodes in the network that are required to support the new service. The model is stored in the nodes' memory (and is usable by the nodes). In some embodiments, packet-shaping and load balancing are performed during the egress and ingress of the packet through the core network. Resources are dedicated to the users of an application based on the application SLA (Service Level Agreement) criteria. The SLA criteria (for dedicating resources to users of an application) include a relative importance of the new service, an end-to-end real-time performance, recognized traffic patterns for which isolation is desirable, and deployment locations of cloud services. In some embodiments, the traffic model to supports new service, which provides the new service based on individual hops of a message, and values of the other Metric Settings determined based on the traffic model In some embodiments, the resources dedicated to the new service users are identified as a slice to enable the new service. In some embodiments, traffic is segregated based on the function, Traffic Segregation is a function of:
(1) the PLMN (Public Land Mobile Network),
(2) the S-NSSAI (SD) (Single-Network Slice Selection Assistance Information-Slice Differentiator), and
(3) the 5G Quality Index (5QI).

In other words, traffic flows that have similar combinations of PLMN, S-NSSAI (SD) and 5QI are grouped together. In this way they are identified as being associated (i.e., "related traffic flows"). Using the traffic segregation function, the following occurs: (1) microslices that are associated with one another are defined, (2) a RAN is configured, and (3) core slices are defined.

In some embodiments, traffic within a slice is differentiated according to QoS requirements. In some embodiments, different QoS profiles are applied to different flows within a slice of non-GBR bearers. DRB (Data Resource Bearer) profiles can be different for the same 5QI flow type in different slices. The traffic is divided into slices and tracked by slice at the level of the PDU (Protocol Data Unit) session. CA (Cloud Architecture) and slice-specific dimensioning are configured to support Differentiated Traffic Handling within the 5GS. SDFs (Service Data Flows) are mapped to QoS flows, and QoS flows are mapped to DRB.

Arbitration can be provided, and an indication can be provided where limitations with existing routers/switches occur, so as to facilitate application SLAs to be better addressed. Control loops for packet shaping across the RAN/Core are performed to adapt to specific UE channel conditions to avoid packet overruns in the eNB/gNB.

Interworking with MNOs (Mobile Network Operators)

In some embodiments, the MNO allows for Neutral-Host-based connectivity. In some embodiments, a Non-3GPP (Non-3rd Generation Partnership Project) N3IWF (Interworking Function) is used to tunnel into the MNO core. In some embodiments, an explicit slice is identified for managing NH (Neutral Host) connectivity to provide improved end-to-end performance for a given application hosted in the MNO core. In some embodiments, a RAN scheduler is provided with RAN slices. Aspects of RAN slices (apart from network slices) allow for better QoS support for an MNO-hosted application or new service Metric Settings.

FIG. 6 indicates how the initial values of the QoS parameters are chosen. As indicated in chart 600, in some embodiments, the QCI is determined based on the input provided about the type of new service. In some embodiments, initially, a GBR setting is chosen for the application, and if the application does not support a packet arrival that demands a GBR setting, the GBR setting is set to a nonGBR setting. The PDB is set to an acceptable network delay. The PDB calibration is performed after identifying the other Metric Settings for the current PDB calibration, and the PDB is subsequently adjusted as needed. The priority is initially set to the highest priority (a priority of 1) to avoid other traffic from impeding the traffic pattern determination for the application. The ARP is also initially set to the highest priority (a priority of 1) so that no application connection or packet is impeded by other traffic. The GBR and MBR are initially set to a large value that is well beyond the expected throughput of the application. The AMBR component of the Access Point Name (APN)-AMBR and the UE-AMBR is provided by the enterprise. The AMBR is adjusted when indicated by the enterprise to subject the APN or UE to specific limits. If the communication uses a UPD protocol, the PER is initially set to $10^{-3}$. If the communication uses a HTTP/HTTPS, TCP, QUIC, OPC or UA protocol, the PER is initially set to $10^{-6}$.

Figure 7:
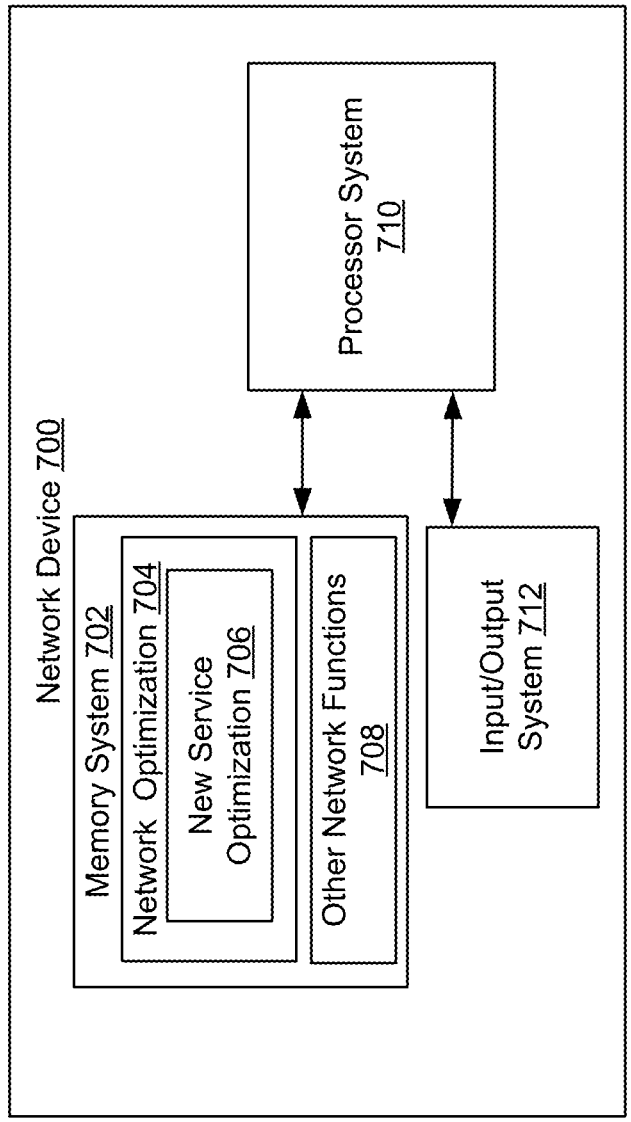
FIG. 7 illustrates an embodiment of a network device.

FIG. 7 illustrates an embodiment of a network device 700. In some embodiments, network device 700 includes memory system 702 having machine instructions. The machine instructions include network optimization 704, new service optimization 706 and other network functions 708. Network device 700 also includes processor system 710 and input/output system 712. The machine instructions stored on memory 702 are implemented by processor system 710. Network optimization 704 measures network performance and adjusts network parameters, based on the measurements to optimize the utilization of network resources. New service optimization 706 optimizes the network parameters associated with a new service to optimize network resource usage while keeping the new service functioning at an acceptable level. New service optimization 706 implements the method of FIGS. 2-4, for example.

Figure 1:
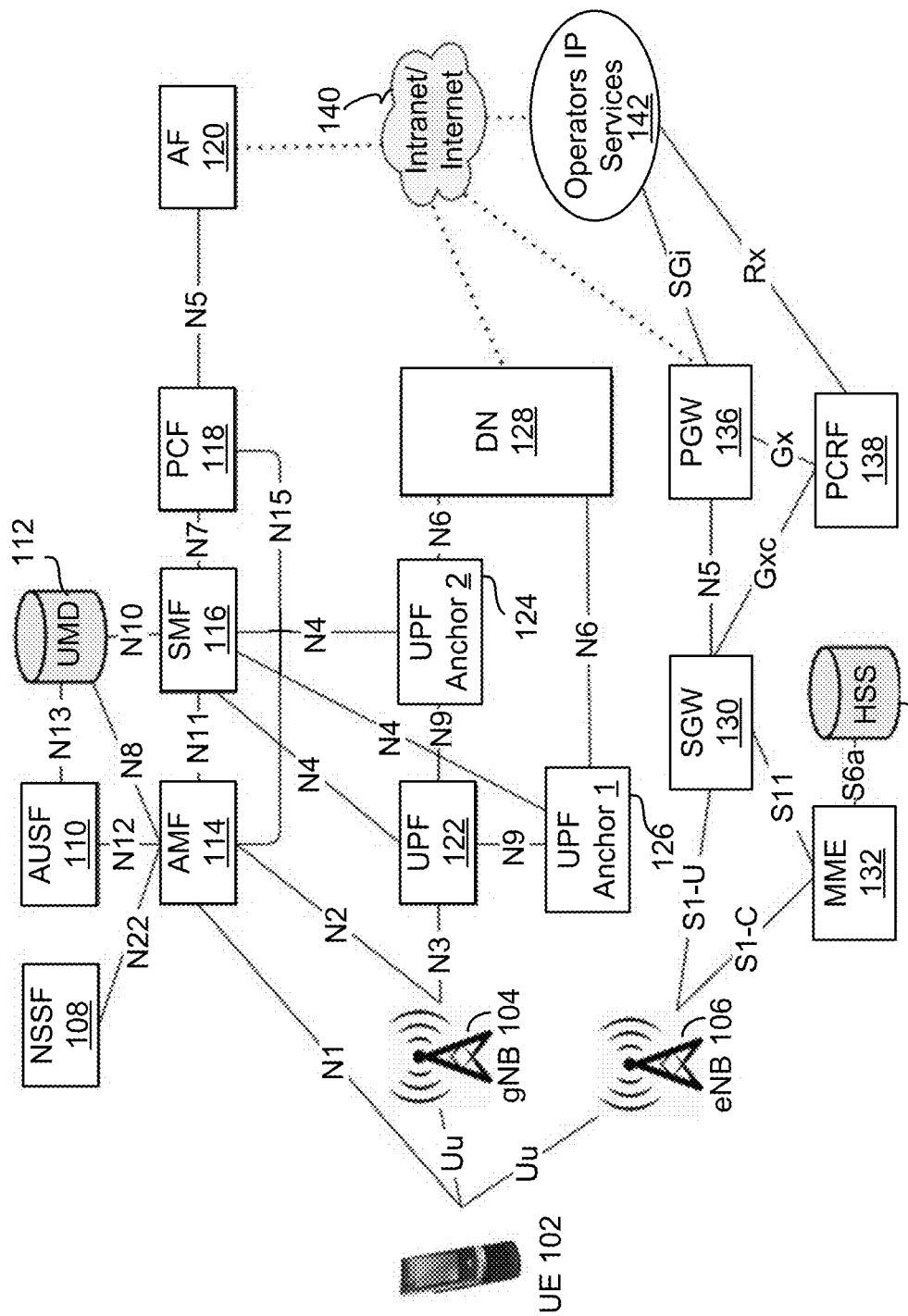
FIG. 1 illustrates a block diagram of a system in which a new service is introduced.

Network device 700 can be any of the network devices of FIG. 1 and may run any combination of elements of network system 100. Memory system 702 includes non-transient computer memory.

In some embodiments, network optimization 704 and application optimization 706 are distributed among multiple devices. In some embodiments, network optimization 704 and application optimization 706 are implemented in-part by devices in the cloud. In some embodiments, network optimization 704 and application optimization 706 are implemented by any combination of the devices of FIG. 1. Other network functions 708 may be any of the network functions of FIG. 1.

Although the disclosed method and apparatus are described above in terms of various examples of embodiments and implementations, it should be understood that the particular features, aspects and functionality described in one or more of the individual embodiments are not limited in their applicability to the particular embodiment with which they are described. Thus, the breadth and scope of the claimed invention should not be limited by any of the examples provided in describing the above disclosed embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide examples of instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

A group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosed method and apparatus may be described or claimed in the singular, the plural is contemplated to be within the scope thereof unless limitation to the singular is explicitly stated.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described with the aid of block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

What is claimed is:
1. A network system comprising:
a network device including at least
  a) a processor system and
  b) a memory system, the memory system including one or more non-transient computer-readable media, the one or more non-transient computer-readable media storing machine instructions, which when invoked cause the processor system to implement a method including at least setting a QoS (Quality of Service) for a new service by i) selecting a first Metric Setting based on a type of service associated with the new service;
  ii) measuring performance metrics based on the selecting of the first Metric Setting, and
  iii) selecting other Metric Settings based on the first Metric Setting and the performance metrics measured;

the first Metric Setting defining an acceptable range of values for the first performance metric, the other Metric Settings defining acceptable ranges of values for other performance metrics, and the memory system storing one or more instructions for taking corrective action when the first Metric Setting or one of the other Metric Settings is not met.

2. A network system comprising:
a network device including at least
a) a processor system and
b) a memory system, the memory system including one or more non-transient computer-readable media, the one or more non-transient computer-readable media storing machine instructions, which when invoked cause the processor system to implement a method including at least setting a QoS (Quality of Service) for a new service by
  i) selecting a first Metric Setting based on a type of service associated with the new service;
  ii) measuring performance metrics based on the selecting of the first Metric Setting, and
  iii) selecting other Metric Settings based on the first Metric Setting and the performance metrics measured;
  iv) varying the other Metric Settings while holding the packet delay budget fixed, and the selecting of the other Metric Settings being based on the varying of the other Metric Settings while initially holding the packet delay budget fixed;
  v) before selecting the first Metric Setting, identifying a type of service provided by V) the new service; and
  vi) selecting the PDB based on a default value associated with the type of the new service;
    wherein the first Metric Setting is a PDB (Packet Delay Budget).

3. A network system comprising:
a) a network device including at least
b) a processor system and
c) a memory system, the memory system including one or more non-transient computer-readable media, the one or more non-transient computer-readable media storing machine instructions, which when invoked cause the processor system to implement a method including at least setting a QoS (Quality of Service) for a new service by
  i) selecting a first Metric Setting based on a type of service associated with the new service;
  ii) measuring performance metrics based on the selecting of the first Metric Setting, and
  iii) selecting other Metric Settings based on the first Metric Setting and the performance metrics measured;
  iv) measuring the performance metrics after values are selected for the other Metric Settings, based on a fixed value of the first Metric Setting, and
  v) tuning the value of the first Metric Setting, after the other Metric Settings have been set based on the fixed value of the first Metric Setting, to improve PRB (Priority Resource Block) utilization.

* * * * *